United States Patent
Sorgard et al.

(10) Patent No.: US 9,965,886 B2
(45) Date of Patent: May 8, 2018

(54) METHOD OF AND APPARATUS FOR PROCESSING GRAPHICS

(75) Inventors: Edvard Sorgard, Trondheim (NO); Borgar Ljosland, Trondheim (NO); Jorn Nystad, Trondheim (NO); Mario Blazevic, Trondheim (NO); Frank Langtind, Tiller (NO)

(73) Assignee: ARM Norway AS, Trondheim (NO)

( * ) Notice: Subject to any disclaimer, the term of this patent is extended or adjusted under 35 U.S.C. 154(b) by 1951 days.

(21) Appl. No.: 11/987,265

(22) Filed: Nov. 28, 2007

(65) Prior Publication Data

US 2008/0150950 A1 Jun. 26, 2008

Related U.S. Application Data

(63) Continuation-in-part of application No. 11/633,647, filed on Dec. 5, 2006, now abandoned.

(30) Foreign Application Priority Data

Dec. 4, 2006 (JP) ................................. 2006-327341
Jun. 5, 2007 (GB) ................................... 0710795.6

(51) Int. Cl.
*G06T 3/20* (2006.01)
*G06T 15/00* (2011.01)
*G09G 5/397* (2006.01)
*G09G 5/39* (2006.01)
*G09G 5/36* (2006.01)
*G09G 5/393* (2006.01)
*G09G 5/30* (2006.01)

(52) U.S. Cl.
CPC ............. *G06T 15/005* (2013.01); *G09G 5/30* (2013.01); *G09G 5/36* (2013.01); *G09G 5/39* (2013.01); *G09G 5/393* (2013.01); *G09G 5/397* (2013.01)

(58) Field of Classification Search
CPC ........................................................ G09G 5/393
USPC ........................................................... 345/501
See application file for complete search history.

(56) References Cited

U.S. PATENT DOCUMENTS 5,175,808 A * 12/1992 Sayre ............................ 345/647
5,305,430 A    4/1994 Glassner
(Continued)

FOREIGN PATENT DOCUMENTS

CN      1641702       7/2005
EP      1 351 195     10/2003
(Continued)

OTHER PUBLICATIONS

Office Action dated Jul. 22, 2010 in co-pending U.S. Appl. No. 11/633,647.
(Continued)

*Primary Examiner* — Javid A Amini
(74) *Attorney, Agent, or Firm* — Nixon & Vanderhye P.C.

(57) ABSTRACT

A graphics processor includes a graphics object list building unit that determines the location of each draw call in a scene to be rendered and generates a list of draw calls for each sub-region (tile) that the scene to be rendered is divided into. The draw call lists are stored in a memory. A graphics object selection unit of a renderer of the graphics processor then determines which draw call is to be rendered next by considering the draw call list stored in the memory for the sub-region (tile) of the scene that is currently being rendered.

25 Claims, 3 Drawing Sheets

(56) References Cited

U.S. PATENT DOCUMENTS

| | | | |
|---|---|---|---|
| 5,392,385 A | | 2/1995 | Evangelisti et al. |
| 5,500,928 A | * | 3/1996 | Cook et al. ............... 345/619 |
| 5,509,110 A | | 4/1996 | Latham |
| 5,522,018 A | | 5/1996 | Takeda et al. |
| 5,555,358 A | * | 9/1996 | Blumer et al. ............. 345/441 |
| 5,574,836 A | | 11/1996 | Broemmelsiek |
| 5,596,685 A | | 1/1997 | Ashton |
| 5,729,672 A | | 3/1998 | Ashton |
| 5,732,219 A | * | 3/1998 | Blumer et al. ............. 709/227 |
| 5,793,966 A | * | 8/1998 | Amstein et al. ........... 709/203 |
| 5,794,017 A | * | 8/1998 | Evans et al. ............... 345/544 |
| 5,808,617 A | * | 9/1998 | Kenworthy et al. ........ 345/421 |
| 5,844,571 A | | 12/1998 | Narayanaswami |
| 5,886,701 A | | 3/1999 | Chauvin et al. |
| 5,949,428 A | | 9/1999 | Toelle et al. |
| 6,084,599 A | * | 7/2000 | Nakatsuka et al. .......... 345/501 |
| 6,189,019 B1 | * | 2/2001 | Blumer et al. ............. 715/205 |
| 6,204,856 B1 | | 3/2001 | Wood et al. |
| 6,288,722 B1 | | 9/2001 | Narayanaswami |
| 6,304,266 B1 | * | 10/2001 | Li ............................... 345/424 |
| 6,326,964 B1 | * | 12/2001 | Snyder et al. .............. 345/419 |
| 6,330,072 B1 | * | 12/2001 | Barada et al. .............. 358/1.18 |
| 6,344,852 B1 | * | 2/2002 | Zhu et al. ................... 345/418 |
| 6,552,723 B1 | * | 4/2003 | Duluk et al. ............... 345/419 |
| 6,628,836 B1 | * | 9/2003 | Wittenbrink et al. ....... 382/232 |
| 6,697,063 B1 | * | 2/2004 | Zhu .............................. 345/421 |
| 6,750,869 B1 | * | 6/2004 | Dawson ...................... 345/531 |
| 6,798,410 B1 | | 9/2004 | Redshaw et al. |
| 6,828,985 B1 | * | 12/2004 | Long et al. ................. 345/620 |
| 6,911,985 B1 | * | 6/2005 | Fujimoto ..................... 345/539 |
| 7,002,571 B2 | | 2/2006 | Lake et al. |
| 7,116,337 B2 | * | 10/2006 | Andrews ..................... 345/592 |
| 7,138,998 B2 | | 11/2006 | Forest et al. |
| 7,142,213 B2 | * | 11/2006 | Nakatsuka et al. .......... 345/501 |
| 7,148,890 B2 | | 12/2006 | Rice et al. |
| 7,167,171 B2 | | 1/2007 | Heim et al. |
| 7,336,283 B2 | * | 2/2008 | McCormack et al. ....... 345/543 |
| 7,418,156 B1 | * | 8/2008 | Candela et al. ............. 382/276 |
| 7,570,266 B1 | * | 8/2009 | Bastos et al. ................ 345/506 |
| 8,022,966 B2 | * | 9/2011 | MacInnis et al. ........... 345/629 |
| 2002/0015064 A1 | * | 2/2002 | Robotham et al. .......... 345/863 |
| 2003/0142100 A1 | * | 7/2003 | Lavelle et al. .............. 345/537 |
| 2003/0151608 A1 | | 8/2003 | Chung et al. |
| 2003/0227457 A1 | * | 12/2003 | Pharr et al. ................. 345/426 |
| 2004/0095343 A1 | | 5/2004 | Forest et al. |
| 2004/0227767 A1 | | 11/2004 | Baroncelli et al. |
| 2005/0140684 A1 | * | 6/2005 | Buehler ....................... 345/531 |
| 2006/0072831 A1 | | 4/2006 | Pallister |
| 2006/0129908 A1 | * | 6/2006 | Markel ........................ 715/500.1 |
| 2006/0170693 A1 | | 8/2006 | Bethune et al. |
| 2007/0101013 A1 | | 5/2007 | Howson |
| 2007/0165035 A1 | * | 7/2007 | Duluk et al. ................ 345/506 |
| 2008/0012878 A1 | | 1/2008 | Nystad et al. |
| 2008/0150950 A1 | * | 6/2008 | Sorgard et al. .............. 345/522 |
| 2008/0170066 A1 | * | 7/2008 | Falchetto .................... 345/419 |
| 2009/0303245 A1 | | 12/2009 | Soupikov et al. |
| 2011/0273476 A1 | * | 11/2011 | Tang et al. .................. 345/660 |
| 2011/0280307 A1 | * | 11/2011 | MacInnis et al. ........ 375/240.15 |

FOREIGN PATENT DOCUMENTS

| | | |
|---|---|---|
| EP | 2 433 014 | 6/2007 |
| GB | 2 251 770 | 7/1992 |
| GB | 2 281 682 | 3/1995 |
| GB | 2 298 111 | 8/1996 |
| GB | 2 343 603 | 5/2000 |
| GB | 2 378 108 | 1/2003 |
| GB | 2 444 628 | 6/2008 |
| GB | 2 444 863 | 6/2008 |
| JP | 2002-526842 | 8/2002 |
| JP | 2003-296747 | 10/2003 |
| JP | 2003-529859 | 10/2003 |
| JP | 2004-348702 | 12/2004 |
| JP | 2004-537129 | 12/2004 |
| JP | 2006-521612 | 9/2006 |
| JP | 2007-157155 | 6/2007 |
| JP | 2008-165760 | 7/2008 |
| WO | WO 90/06561 | 6/1990 |
| WO | WO 95/28685 | 10/1995 |
| WO | WO 97/06512 | 2/1997 |
| WO | WO 98/29838 | 7/1998 |
| WO | 00/11605 | 3/2000 |
| WO | WO 00/28483 | 5/2000 |
| WO | WO 01/75803 | 10/2001 |
| WO | WO 01/95257 | 12/2001 |
| WO | WO 03/010717 | 2/2003 |
| WO | WO 2004/023399 | 3/2004 |
| WO | WO 2004/066059 | 8/2004 |
| WO | WO 2004/086309 | 10/2004 |
| WO | WO 2005/020582 | 3/2005 |
| WO | WO 2005/116930 | 12/2005 |

OTHER PUBLICATIONS

Final Office Action dated May 24, 2011 in co-pending U.S. Appl. No. 11/633,647.

First Office Action dated Sep. 23, 2011 in CN 200710306692.2 (8 pages).

M. Olano et al "Triangle Scan Conversion using 2D Homogeneous Coordinates" Proceedings of the ACM SIGGRAPH/Eurographics Workshop on Graphics, 1997, pp. 89-95.

M. Cox et al, "Architectural Implications of Hardware-Accelerated Bucket Rendering on the PC" Proceedings of the ACM SIGGRAPH/Eurographics Workshop on Graphics, 1997, pp. 25-34.

J. Pineda, "A Parallel Algorithm for Polygon Rasterization" Computer Graphics, vol. 22, No. 4, Aug. 1988, pp. 17-20.

J. Foley et al, Computer Graphics, Second edition, 1990, pp. 668-672.

English translation of Third Office Action dated May 14, 2012 in Chinese application No. 200610130945.0.

Office Action issued in co-pending U.S. Appl. No. 12/686,187, dated Mar. 27, 2013.

English Translation of Chinese Office Action dated Dec. 12, 2012 in Chinese Application No. 200610130945.0.

Japanese Office Action and English Translation of Japanese Office Action dated Oct. 22, 2013 in Japanese Application No. 2010-005906.

United Kingdom Intellectual Property Office Search Report and Examination Report dated Apr. 16, 2009 in corresponding Great Britain Application No. GB0900700.6, 4 pages.

United Kingdom Intellectual Property Office Search Report and Examination Report dated May 11, 2010 in corresponding Great Britain Application No. GB1000710.2, 6 pages.

Maurice Ribble, gdc2008, Next-Gen Tile-Based GPUs, Feb. 18-22, 2008; San Francisco, 42 pages.

Jason Cross Publication, Intel Lifts the Larrabee Veil a Little, Tile Rendering is Back-CPUs, Boards & Components by Extreme Tech.mht. Aug. 4, 2008, 4 pages.

Crisu et al., 3D Graphics Tile-Based Systolic Scan-Conversion, downloaded Feb. 2010, pp. 517-521.

Crisu et al., Efficient Hardware for Antialiasing Coverage Mask Generation, Jun. 2004, pp. 1-8, (Proceedings of the Computer Graphics International).

Crisu et al., Efficient Hardware for Tile-Based Rasterization, Nov. 2004, pp. 1-6.

Greene et al., Hierarchical Polygon Tiling with Coverage Masks, Jun. 20, 1995, pp. 65-76.

Zone Rendering—Whitepaper, Document No. 298587-001, May 2002, pp. 1-15.

Kim Jeong Hyun, Hardware-Driven Visibility Culling paper, Document No. 20073114, pp. 1-7, 2007, (http://jupiter.kaist.ac.kr/~sungeui/SGA07/).

Office action dated Jan. 26, 2010 in co-pending U.S. Appl. No. 11/633,647.

Office action dated May 19, 2009 in co-pending U.S. Appl. No. 11/633,647.

U.S. Appl. No. 12/686,187, filed Jan. 12, 2010, Nystad et al.

U.S. Appl. No. 12/588,172, filed Oct. 6, 2009, Nystad et al.

(56) References Cited

OTHER PUBLICATIONS

Office Action dated Aug. 3, 2017 in co-pending U.S. Appl. No. 14/854,525, 14 pages.
Decision on Appeal dated Jul. 16, 2015 in co-pending U.S. Appl. No. 11/633,647, 10 pages.
English translation of Japanese Office Action dated Mar. 21, 2012, in corresponding Japanese Application No. 2007-314022.

\* cited by examiner

METHOD OF AND APPARATUS FOR PROCESSING GRAPHICS

This application is a Continuation-In-Part of U.S. application Ser. No. 11/633,647 filed Dec. 5, 2006 and claims priority to JP 2006-327341 filed Dec. 4, 2006 and UK 0710795.6 filed Jun. 5, 2007, the entire contents of each of which are hereby incorporated herein by reference.

The technology described in this application relates to a method of and apparatus for processing graphics, and in particular to such a method and apparatus for use in a tile-based graphics processing system.

The description is made with particular reference to the processing of three-dimensional graphics, although as will be appreciated by those skilled in the art, it is equally applicable to the processing of two-dimensional graphics as well.

As is known in the art, graphics processing is normally carried out by first splitting the scene to be displayed into a number of similar basic components or primitives, which primitives are then subjected to the desired graphics processing operations. The graphics "primitives" are usually in the form of simple polygons, such as triangles, and are usually described by defining their vertices.

For the graphics processing operations, each graphics primitive is usually further divided, as is known in the art, into discrete graphic entities or elements, usually referred to as "fragments", on which the actual graphics processing operations (such as rendering operations) are carried out. Each such graphics fragment will represent and correspond to a given position in the primitive and comprise, in effect, a set of data (such as colour and depth values) for the position in question.

Each graphics fragment (data element) usually corresponds to a single pixel (picture element) in the final display (since as the pixels are the singularities in the final picture to be displayed, there will usually be a one-to-one mapping between the "fragments" the graphics processor operates on and the pixels in the display). However, it can be the case that there is not a direct correspondence between "fragments" and "pixels", for example where particular forms of post-processing such as down-scaling are carried out on the rendered image prior to displaying the final image.

Thus two aspects of graphics processing that are typically carried out are the "rasterising" of graphics "primitive" (polygon) position data to graphics fragment position data (i.e. determining the (x, y) positions of the graphics fragments to be used to represent each primitive in the scene to be displayed), and then "rendering" the "rasterised" fragments (i.e. colouring, shading, etc. the fragments) for displaying on a display screen.

(In graphics literature, the term "rasterisation" is sometimes used to mean both primitive conversion to fragments and rendering. However, herein "rasterisation" will be used to refer to converting primitive data to fragment addresses only.)

Many graphics processing systems use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

Other terms that are commonly used for "tiling" and "tile-based" rendering include "chunking" (the sub-regions are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This can allow the overall amount of graphics processing necessary for a given scene to be reduced.

In a tile-based rendering system, it is accordingly usually desirable to be able to identify and know those primitives that are actually present in a given sub-region (tile), so as to, e.g., avoid unnecessarily rendering primitives that are not actually present in a tile. In order to facilitate this, it is known to prepare for each sub-region (tile) a list of the primitives to be rendered for that sub-region (e.g. that will appear in the sub-region). Such a "tile-list" (which can also be referred to as a "primitive list") identifies (e.g. by reference to a primitive indicator) the primitives to be rendered for the tile (sub-region) in question.

The process of preparing tile lists for each sub-region (tile) to be rendered basically therefore involves determining the primitives that should be rendered for a given sub-region (tile). This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the tile list for each tile that it falls within.) In effect, each sub-region (tile) can be considered to have a bin (the tile-list) into which any primitive that is found to fall within (i.e. intersect) the sub-region is placed (and, indeed, the process of sorting the primitives on a tile-by-tile basis in this manner is commonly referred to as "binning").

As known in the art, the process of determining the primitives that should be listed (rendered) for any given tile can be carried out at varying levels of precision, for example depending on efficiency optimisations for different parts of the tiling and rendering processes. For example, at the most precise level, it could be determined exactly which tiles a given primitive will appear at least in part in, and the primitive then included in the tile lists for those tiles only. This is commonly referred to as "exact" binning.

Figure 1:
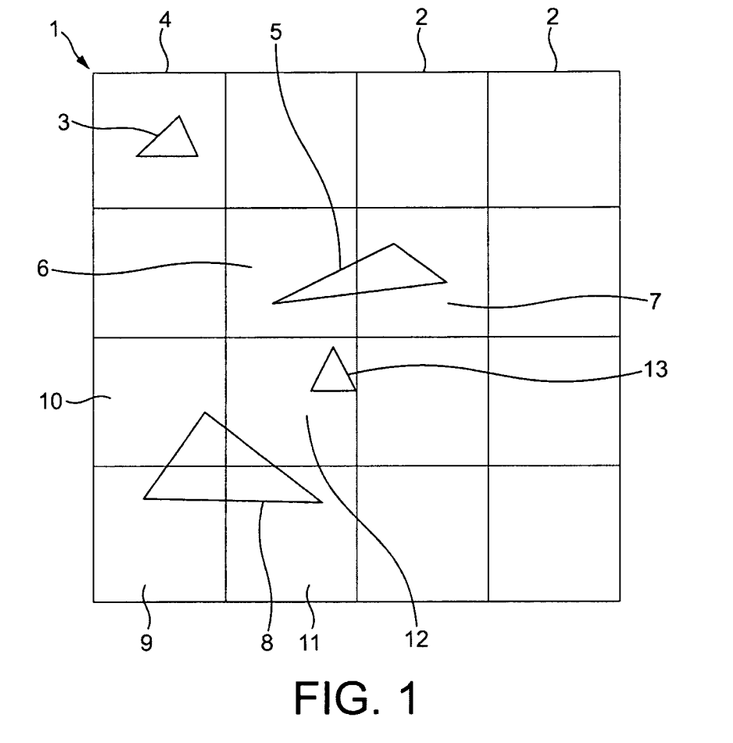
FIG. 1 shows schematically a tile-based graphics-processing arrangement.

FIG. 1 illustrates the exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the tile-list for each tile that it is found to fall within. Thus, taking the example shown in FIG. 1, the primitive 3 is added to the tile-list for tile 4, the primitive 5 is included in the tile-list for tiles 6 and 7, the primitive 8 is included in the tile lists for tiles 9, 10, 11 and 12, and the primitive 13 is included in the tile-list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare tile-lists with a lower precision than is achieved with exact binning. This can be useful to, e.g., simplify the preparation of the tile-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the tile-lists.

Once lists of primitives to be rendered (tile-lists) have been prepared for each sub-region (tile) in this way, the (tile-)lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

However, the Applicants believe that there remains scope for improvement to existing tile-based rendering systems.

According to a first aspect of the technology, there is provided an apparatus for sorting graphics data for processing in a graphics processing system in which a scene to be rendered is divided into a plurality of sub-regions for rendering, the apparatus comprising:

means for sorting graphics descriptors that relate to or have associated with them a location or locations in a scene to be rendered into sub-regions or the sub-regions that the scene is divided into.

According to a second aspect, there is provided a method of sorting graphics data for processing in a graphics processing system in which a scene to be rendered is divided into a plurality of sub-regions for rendering, the method comprising:

sorting graphics descriptors that relate to or have associated with them a location or locations in a scene to be rendered into sub-regions or the sub-regions that the scene is divided into.

According to a third aspect, there is provided an apparatus for processing graphics data for processing in a graphics processing system in which a scene to be rendered is divided into a plurality of sub-regions for rendering, the apparatus comprising:

means for associating graphics descriptors that relate to or have associated with them a location or locations in a scene to be rendered with a sub-region or sub-regions that the scene is divided into.

According to a fourth aspect, there is provided a method of processing graphics data for processing in a graphics processing system in which a scene to be rendered is divided into a plurality of sub-regions for rendering, the method comprising:

associating graphics descriptors that relate to or have associated with them a location or locations in a scene to be rendered with a sub-region or sub-regions that the scene is divided into.

According to a fifth aspect, there is provided an apparatus for sorting graphics data for processing in a graphics processing system in which a scene to be rendered is divided into a plurality of sub-regions for rendering, the apparatus comprising:

means for preparing, for one or more of the sub-regions that the scene can be divided into, a list of graphics descriptors, e.g., and preferably for processing, each graphics descriptor being something other than a single primitive of the scene to be rendered.

According to a sixth aspect, there is provided a method of sorting graphics data for processing in a graphics processing system in which a scene to be rendered is divided into a plurality of sub-regions for rendering, the method comprising:

preparing, for one or more of the sub-regions that the scene can be divided into, a list of graphics descriptors, e.g., and preferably for processing, each graphics descriptor being something other than a single primitive of the scene to be rendered.

The technology described in this application is directed to a tile-based rendering system (i.e. one in which the scene to be rendered is divided into plural sub-regions). However, unlike in prior art tile-based rendering systems, rather than simply sorting into "tiles" and including in "tile lists", the basic primitives, such as "simple" polygons, such as triangles, quads, lines or points, etc., that the scene to be rendered is described in terms of (i.e. the smallest "polygon" description of the scene), other graphics descriptors that are not simple primitives can be and are sorted on a tile-by-tile (sub-region-by-sub-region) basis and placed in (included in) "tile lists".

The Applicants have recognised that there may be advantages to sorting not only the basic, simple primitives that describe and define a scene to be rendered into tiles, but also other forms of scene (graphics) description (descriptors).

For example, one could instead or as well (selectively) store graphics descriptors that represent plural individual primitives in common, such as draw calls, in the tile lists, which would then allow the amount of memory that is used for the tile lists to, e.g., be varied and/or reduced. This facilitates better control over and knowledge of the memory usage requirements for the tile listing process. This is advantageous in graphics systems, particularly where they are to be implemented on more restricted devices, such as portable devices (e.g. mobile phones, PDAs, handheld devices, etc.).

The Applicants have also recognised that carrying out a tiling operation or operations on graphics descriptors other than individual primitives can provide other advantages. For example, it can allow sorting and culling of graphics data in the form of these other graphics descriptors.

It can also mean that the tiling operation itself is less time and processing resource intensive and therefore can, e.g. more readily be performed, e.g. for the purposes of a coarser initial sorting of the graphics data (descriptions). For example, it could be used to carry out an initial coarser tiling of the graphics data, e.g. at a larger graphics descriptor level, to, e.g., see if any of the graphics descriptors can immediately be discarded (culled) from further processing without the need to prepare tile-lists at the basic primitive level for that purpose.

Thus the technology described in this application can facilitate, e.g., forms of culling and/or of hidden surface removal, e.g., and preferably, prior to rendering.

The sub-regions (tiles) that the scene to be rendered is divided into can be any suitable and desired such sub-regions. They are preferably all the same size and shape (i.e. regularly-sized and shaped tiles are preferably used), as is known in the art, although this is not essential. The sub-regions are preferably square or rectangular. The size and number of sub-regions can be selected as desired. In a preferred arrangement, each sub-region (tile) is 16×16 or 32×32 fragments in size (with the scene then being divided into however many such sub-regions as are required for the display (frame) size that is being used).

In a preferred embodiment, tile lists (lists of graphic descriptors) can be prepared for individual sub-regions and/or for a set or sets of sub-regions comprising more than one sub-region. Where a tile list (a list of graphic descriptors) (a common, stored tile list) is prepared for a set of more than one sub-region, then the set of more than one sub-region preferably comprises an integer number of sub-regions, and preferably comprises a group of contiguous sub-regions.

The graphics descriptors that are sorted into sub-regions and/or listed for the sub-regions, etc., can be any suitable and desired such descriptors. They should, as will be appreciated by those skilled in the art, be something other than simple base primitives, such as simple polygons, such as triangles, quads, lines or points that may be and will be used to describe the scene for the actual rendering process (and thus will not be in form of simple primitives, such as triangles, lines, quads or points).

Similarly, the graphics descriptors should have or comprise a description (e.g. and preferably relating to or of something in (a part of) the scene to be rendered) that has some form of, or a particular or selected, etc., position or locality (location) in the scene to be processed associated with them (as it is this property that makes it appropriate and desirable to sort them by their location in the scene). Thus the graphics descriptors preferably comprise or have associated with them geometry and/or information that communicates a position or location in the scene to a subsequent stage or stages of the graphic processing.

In practice, the technology described in this application can be applied to any graphics descriptor that communicates position information (has associated with it a position) to a graphics process, such as descriptors that define where a graphics process (procedure) should be carried out, where an object or objects should be drawn, etc.

In one preferred embodiment, the graphics descriptors comprise a description of some form of graphics processing (procedure) that is to be performed in a given, particular, scene locality or area, such as an indication that a particular graphics process or processing should be activated in a given locality or area or location of the scene.

For example, the graphics descriptor could define a routine or procedure, such as a program, for generating (telling the system to generate) a set of primitives at a given location in the scene to be rendered. They could, for example, comprise procedural draw calls.

In a preferred embodiment, the graphics descriptors represent or comprise an object to be rendered, but in a form other than as a simple polygon or primitive. Thus, in a preferred embodiment, the graphics descriptors comprises graphics objects but which are not individual simple primitives.

For example, the graphics descriptors can also or instead, and preferably do, comprise higher order or higher level descriptions of, e.g. objects to be rendered, such as, and preferably, a description of an object before it is converted into a primitive (e.g. triangle) representation.

An example of such a higher order or higher level, description of an object to be rendered would be a smooth surface representative of an object (e.g. where the "object" comprises a smooth, e.g., curved, surface). In this case the smooth surface descriptors of the smooth surface(s) in the scene could be sorted in the manner described.

Another form of higher order definition of graphic objects which the technology could be applied would be a program or procedure telling the graphics system how to generate a set of primitives at a given location in the scene.

Thus, in a preferred embodiment, the graphics descriptor or descriptors comprise non-primitive and/or pre-primitive descriptions of objects to be rendered, e.g., and preferably that are used for the object or objects in question before a "primitive" description of the object exists. In other words, in a preferred embodiment the graphic descriptors comprise precursor descriptors (descriptions) of objects to be rendered (i.e. descriptions that precede primitive level descriptions of the objects). In these cases, the graphics descriptors will represent the object to be rendered and there may not as yet be a "primitive-level" or primitive-based description of the object, but rather the intention will be that the graphics descriptors will in time be converted to a primitive-based description of the object, but the primitive-based description of the object may not exist yet.

Such non-primitive-based graphics descriptors could be thought of, for example, as being "meta-primitives" that, e.g., are to be transformed into "simple" primitives in due course.

It would also be possible for the graphics descriptors to comprise and/or represent a group or set of plural primitives, such as a set of plural contiguous triangles. In this case, a primitive-level description of an object may exist, but rather than sorting each primitive individually, groups of primitives would be sorted together. This could, in effect, allow a coarser representation of objects to be rendered to be "tiled", even once "primitive" descriptions of the objects may exist. An example of such an arrangement would be to use a bounding box encompassing a plurality of primitives as the graphic descriptor that is sorted, etc., in the manner of the described.

In a preferred such embodiment, the graphics descriptor or descriptors comprise a draw call (or draw calls). (As is known in the art, in graphics processing primitives are commonly grouped together in sets, e.g., for a particular scene region, which the programmer intends to be rendered in one go, together as a group. Such groups of primitives that are to be processed together are commonly referred to as "draw calls"). Thus, in a particularly preferred embodiment, draw calls of the scene are sorted into tiles (placed into tile lists). The draw calls in such an arrangement may be procedural draw calls (e.g. draw calls which define a procedure to generate primitives) if desired.

As will be appreciated by those skilled in the art, in the use of draw calls, for example, while any given draw call will typically represent and comprise plural primitives, there may be draw calls that include or represent a simple primitive only. However, this is still within the scope of preferred embodiments at least, since the draw call is a graphics description that is capable of representing plural primitives in common, even if in practice it may not always do so.

In other words, as will be appreciated by those skilled in the art, the intention is to use graphics descriptors that are not simply single primitives (and that are distinguished from single primitive descriptions of objects to be rendered), but that either comprise or represent or can represent plural primitives in common and/or that are non-primitive-based descriptions of objects to be rendered or graphics processes to be performed.

Thus, in a particularly preferred embodiment, the graphics descriptors comprise non-primitive-based descriptions of objects to be rendered and/or of graphics processes to be performed, and/or descriptions of graphics objects to be rendered and/or of graphics processes to be performed that comprise or represent or that can represent plural primitives.

In a preferred embodiment, tile lists (graphics descriptors lists) are prepared for a given type of graphics descriptor. In other words, graphics descriptors of a given type, such as draw calls, are sorted into sub-regions (tiles). In one preferred embodiment, only a single type or class of graphics descriptors is included in any given list.

However, it would also be possible to include graphics descriptors of different types in the same list, and thus in another preferred embodiment, graphics descriptors of different types can each be included in a given sub-region's (or set of sub-regions') list (tile list).

It would also be possible to include simple primitives, such as graphics primitives in the form of simple polygons such as triangles, quads, lines or points, in the tile lists together with the other graphics descriptors, if desired. (The technology described here does not preclude additionally (e.g. simultaneously or subsequently) preparing tile lists of the basic graphics primitive for rendering, if desired.)

The lists of graphics descriptors can be prepared for, e.g., selected sub-regions (tiles) only, but in a preferred embodiment a graphics descriptors list is prepared for each sub-region (tile) that the scene is divided into.

The sorting of the graphics descriptors into sub-regions, and the preparation of a graphic descriptors list for the sub-regions, can be carried out in any appropriate and desired manner. For example, any technique already known and used for sorting and binning primitives into tile-lists, such as exact binning, or bounding box binning, or anything in between, can be used for this process.

Thus, for example, an initial determination of the sub-regions that a graphics descriptor is to be processed for could be made based on a determined location of the graphics descriptor in the scene (which location could, e.g., be the exact location of the graphics descriptor or an approximation of the graphics descriptor's location based on, e.g., a bounding box surrounding the graphics descriptor, as is known in the art), and the graphics descriptor then listed in some or all of the sub-regions that its determined location indicates it should be rendered for. This would then, e.g. and preferably, be repeated for each graphics descriptor in the scene to allow a complete set of graphic descriptor lists for the scene to be prepared.

Thus, in a preferred embodiment, a location for a given graphics descriptor in the scene is determined and compared to the sub-regions and/or sets of plural sub-regions that the scene is divided into to determine which sub-regions and sets of plural sub-regions the graphics descriptor could or should be processed for (e.g. appears (falls) within).

In these arrangements, the location of the graphics descriptor can be derived as desired, such as and preferably, from location or position data of or associated with the graphics descriptor. Similarly, the position of the sub-regions can be derived in any desired and suitable manner. Where appropriate, any position or location of or associated with a graphics descriptor is preferably transformed to the position the descriptor will have in the scene as it is to be rendered, before the descriptor is sorted into the sub-regions, etc., so as to help ensure that it is the "final", correct position of the descriptor that is considered.

Where a bounding box technique is being used, then the bounding boxes can be generated where and as desired. For example, the bounding boxes could be generated on a per graphics descriptors basis, or for a set or sets of plural graphics descriptor, as is known in the art. The bounding boxes could, e.g., be generated by the graphics processor API or driver on the host system.

The individual graphics descriptors lists and the graphics descriptors in them can be arranged in any desired and suitable fashion and include any desired and suitable data. The lists are preferably arranged and contain data in the same or similar manner as is already used for such or similar graphics descriptors, tile lists, etc., in the art.

Once the graphics descriptors have been sorted and graphics descriptor lists have been prepared for the sub-regions as discussed above, then this information can be used for processing of the graphics descriptors (and, e.g., of the primitives that they represent). Such processing can comprise any suitable and desired processing.

In one preferred embodiment, this processing comprises rendering the graphics descriptors. In other words, it comprises using the graphics descriptor lists when rendering the scene, and preferably to determine which graphic descriptors (and hence primitives, for example) need to be processed (rendered) for each sub-region.

This rendering process may be and preferably is carried out in a similar manner to known tile-based rendering systems. Thus, preferably, each sub-region (tile) is processed and rendered separately, i.e. the separate, individual sub-regions are rendered one-by-one. This rendering can be carried out in any desired manner, for example, by rendering the individual sub-regions in succession or in a parallel fashion. Once all the sub-regions (tiles) have been rendered, they can then be recombined, e.g., in a frame buffer, for display, as is known in the art.

In another preferred embodiment, the graphics descriptors lists, etc., are also or instead used to performing an (e.g., and preferably, initial) culling operation (e.g. hidden surface removal) before the scene is rendered, for example and preferably, to remove from (future) processing graphics descriptors that it can be determined will not be seen in the scene as will be displayed. Such culling could comprise, e.g., determining if any graphics descriptor will fall outside the visible area of the scene (in which case they can be discarded). More sophisticated culling arrangements could, of course, also or instead be used.

In a preferred such embodiment, the positions or locations of the graphics descriptor(s) are compared to the positions or locations of one or more areas or sub-regions of the scene, etc.

As discussed above, the technology described can facilitate such operation, as sorting or tiling, e.g., larger graphics objects, rather than individual primitives, can be less processing intensive, etc.

Although the technology has been described with particular reference to sorting, etc, the graphics descriptors with reference to sub-regions (tiles) that the scene will be divided into for rendering, as will be appreciated by those skilled in the art, such sorting could be carried out for and with respect to other areas at the scene, if desired. For example, in the case of culling operations, it may be desirable simply to compare the positions of the graphics descriptors with the visible area of the scene (to see, e.g. if any of the descriptors fall wholly outside the visible area of the scene).

Thus, according to a seventh aspect, there is provided an apparatus for sorting graphics data for processing in a graphics processing system, the apparatus comprising:

means for sorting graphics descriptors that relate to or have associated with them a location or locations in a scene to be rendered into particular areas or sub-regions of the scene.

According to an eighth aspect, there is provided a method of sorting graphics data for processing in a graphics processing system, the method comprising:

sorting graphics descriptors that relate to or have associated with them a location or locations in a scene to be rendered into particular areas or sub-regions of the scene.

According to a ninth aspect, there is provided an apparatus for processing graphics data for processing in a graphics processing system, the apparatus comprising:

means for associating graphics descriptors that relate to or have associated with them a location or locations in a scene to be rendered with a particular area or areas or sub-region or sub-regions of the scene.

According to a tenth aspect, there is provided a method of processing graphics data for processing in a graphics processing system, the method comprising:

associating graphics descriptors that relate to or have associated with them a location or locations in a scene to be rendered with a particular area or areas or sub-region or sub-regions of the scene.

According to an eleventh aspect, there is provided an apparatus for processing graphics data for processing in a graphics processing system, the apparatus comprising:

means for preparing, for one or more areas or sub-regions of a scene to be rendered, a list of graphics descriptors, e.g. and preferably for processing, each graphics descriptor being something other than a single primitive of the scene to be rendered.

According to a twelfth aspect, there is provided a method of processing graphics data for processing in a graphics processing system, the method comprising:

preparing, for one or more areas or sub-regions of a scene to be rendered, a list of graphics descriptors, e.g. and preferably for processing, each graphics descriptor being something other than a single primitive of the scene to be rendered.

According to a thirteenth aspect, there is provided an apparatus for processing graphics data for processing in a graphics processing system, the apparatus comprising:

means for comparing the positions or locations of graphics descriptors of a scene to be rendered with the position or location of a particular or selected area or areas or sub-region or sub-regions of the scene.

According to a fourteenth aspect, there is provided a method of processing graphics data for processing in a graphics processing system, the method comprising:

comparing the position or location of a graphics descriptor for a scene to be rendered with the position or location of a particular or selected area or areas or sub-region or sub-regions of the scene.

As will be appreciated by those skilled in the art, these aspects and embodiments can and preferably do include any one or more as all of the preferred and optional features described herein, as appropriate. Thus, for example, the graphics descriptors can take any of the forms discussed above. Similarly, the selected area or areas of the scene that the graphics descriptors are sorted into preferably comprise the sub-region (tiles) that the scene is to be divided into for rendering purposes, although that need not be the case, and the areas could, e.g., also or instead relate to visible and non-visible regions of the scene, etc., if desired.

The various functions can be carried out in any desired and suitable manner. In a particularly preferred embodiment they are carried out on a single graphics processing platform that generates and outputs the graphics data that is written to the frame buffer for the display device. The functions can be implemented in hardware or software, as desired. In a preferred embodiment the system is implemented as a hardware element (e.g. ASIC). Thus, in another aspect comprises a hardware element including the apparatus of, or operated in accordance with the method of, any one or more of the aspects described herein.

It should also be noted here that, as will be appreciated by those skilled in the art, the various functions, etc., may be duplicated and/or carried out in parallel on a given processor.

The technology described in this application is applicable to any form or configuration of graphics processor and renderer, such as renderers having a "pipelined" arrangement (in which case the renderer will be in the form of a rendering pipeline).

As will be appreciated from the above, the technology described in this application is particularly, although not exclusively, applicable to 3D graphics processors and processing devices, and accordingly extends to a 3D graphics processor and a 3D graphics processing platform including the apparatus of, or operated in accordance with the method of, any one or more of the aspects described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments of the technology described in this application can include, as appropriate, any one or more or all of the preferred and optional features described herein.

The methods described may be implemented at least partially using software e.g. computer programs. It will thus be seen that when viewed from further aspects the technology provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data-processing system. The technology described in this application also extends to a computer software carrier comprising such software which when used to operate a graphics processor, renderer or microprocessor system comprising data processing means causes in conjunction with said data processing means said processor, renderer or system to carry out the steps of the methods described. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods need be carried out by computer software and computer software may be installed on a computer software carrier for carrying out at least one of the steps of the methods set out herein.

The technology described in this application may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of preferred example embodiments will be described by way of example only and with reference to the accompanying drawings, in which.

An example embodiment will now be described with reference to FIGS. 2 and 3.

In the present embodiment, the graphics descriptors that are "tiled" and listed in tile lists comprise graphics objects in the form of draw calls. However, as discussed above, other arrangements would, of course be possible.

Figure 2:
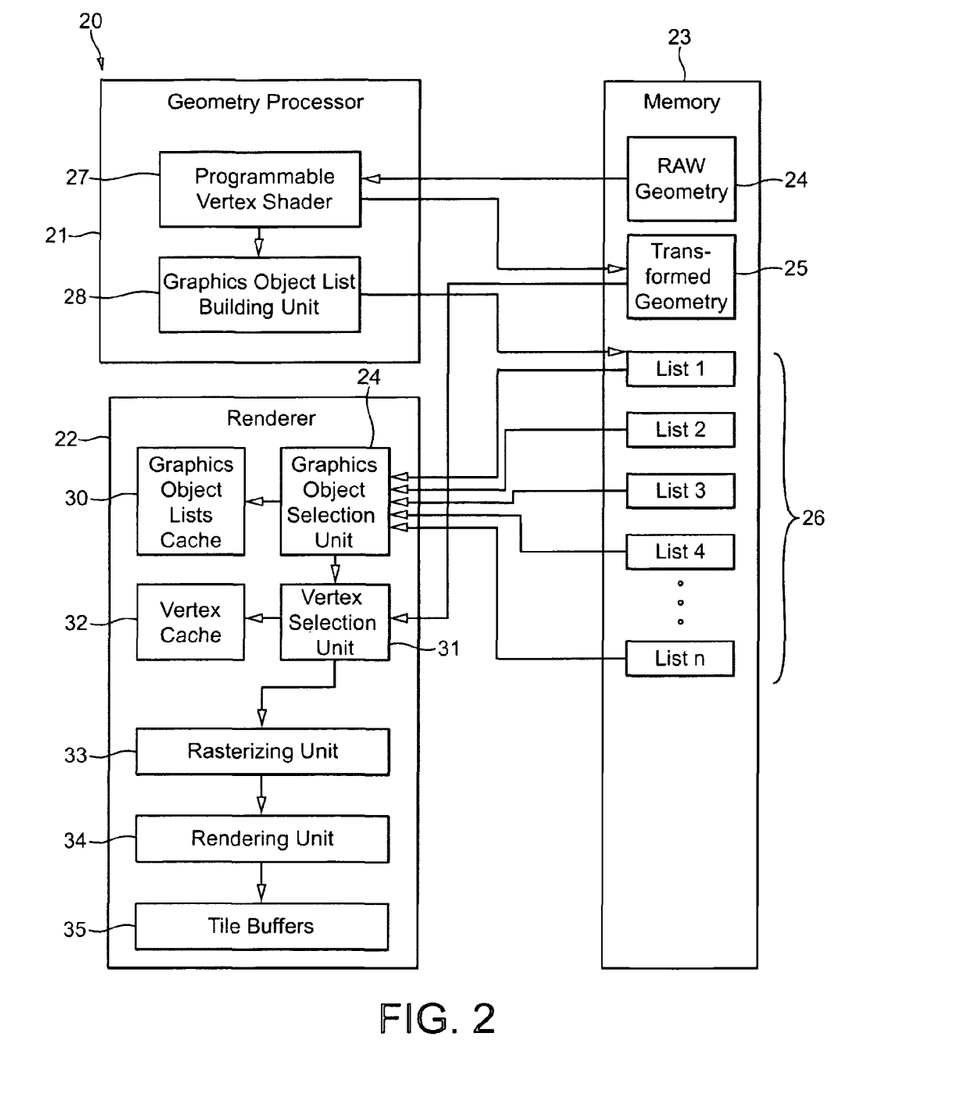
FIG. 2 shows schematically an arrangement of a graphics processor.

FIG. 2 shows schematically a graphics processor 20 that may be operated in accordance with the technology described. The graphics processor 20 includes a geometry processor 21, and a renderer 22, both of which can access a memory 23. The memory 23 may be, as is known in the art, "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20, as is known in the art), a set of transformed geometry data 25 (which is the result of various transformation and processing operations carried out on the raw geometry 24, again, as is known in the art), and a set of graphics object (descriptor) lists 26. The graphic object lists 26 are prepared in accordance with a process described in more detail below.

The transformed geometry data 25 comprises, for example, transformed vertices (vertex data), etc., as is known in the art.

The geometry processor 21 comprises, inter alia, a programmable vertex shader 27, and a graphics object (descriptor) list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the frame to be displayed. The programmable vertex shader 27 and the processes it carries out can take any suitable form and be any suitable and desired such processes known in the art.

The graphics object list building unit 28 carries out the process of allocating the graphics objects (descriptors—in the present case, draw calls) to the graphics object (descriptor) lists which are then used by the renderer 22 to identify the graphics objects (descriptors) that should be rendered for each sub-region of the scene to be rendered. To do this, the graphics object list building unit 28 takes as its input the transformed and processed vertex data from the programmable vertex shader 27 (i.e. the positions of the graphics object in the scene), builds graphics object (tile) lists using that data, and stores those lists as the graphics object lists 26 in the memory 23.

The renderer 22 includes a graphics object (descriptor) selection unit 29, a graphics object list cache 30, a vertex selection unit 31, a vertex data cache 32, a rasterising unit 33, a rendering unit 34, and tile buffers 35.

The rasterising unit 33, rendering unit 34, tile buffers 35 operate, in this embodiment, in the same manner as such units operate in existing graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The graphics object selection unit 29 of the renderer 22 determines which graphics object (draw call in the present case) and hence which primitive, is to be rendered next. It does this by considering the graphics object lists 26 stored in the memory 23, and selecting from one of those lists the next graphics object (draw call) to be rendered.

The graphics object selection unit 29 can also place one or more graphic object lists in the graphics object list cache 30.

The graphics object selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

Figure 3:
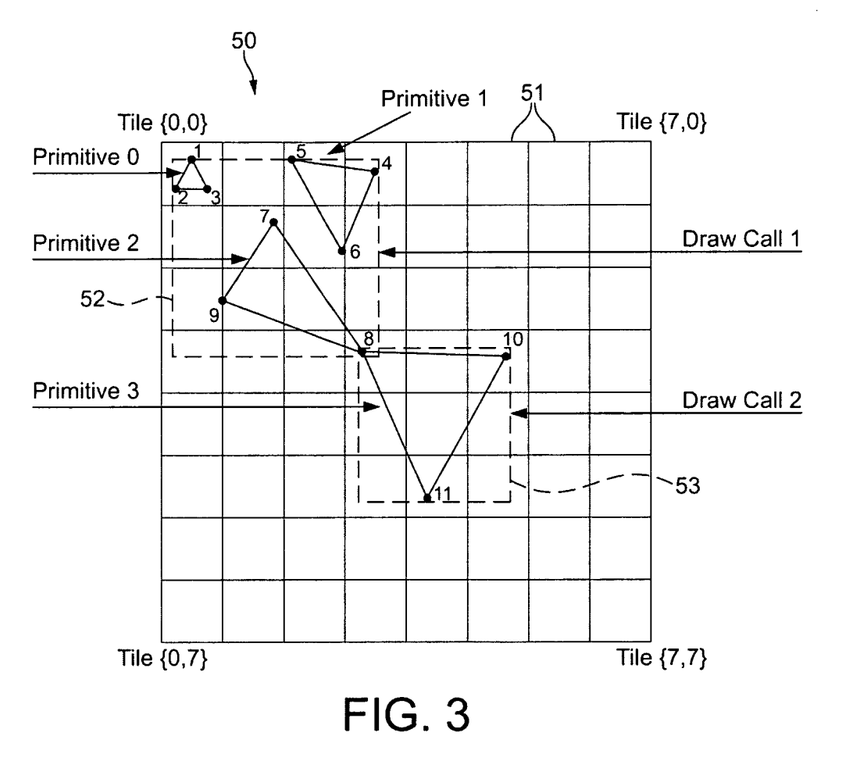
FIG. 3 shows an exemplary scene of primitives to be displayed.

FIG. 3 shows an exemplary scene to be displayed that will be used as the exemplary scene for display in the description of this embodiment.

As can be seen from FIG. 3, the scene 50 contains four primitives, which are grouped into two "draw calls", draw call 1 and draw call 2. Primitives 0, 1 and 2 are grouped as draw call 1, and primitive 3 belongs to draw call 2. (As is known in the art, grouping primitives in "draw calls" basically means that the application programmer wants all the primitives in the draw call to be drawn in one go, typically for performance reasons. Primitive groups in the same draw call typically share the same state and shader programs data.)

It should also be noted here that in view of the fact that there are two separate draw calls, with primitive 2 in one and primitive 3 in the other, the vertex 8 shown in FIG. 3 cannot be shared between primitive 2 and primitive 3, but instead is represented as two different vertices, with the same vertex location and vertex attributes.

As shown in FIG. 3, the scene 50 to be rendered is divided into plural individual sub-regions or tiles 51.

(As will be appreciated by those skilled in the art, in practice any given scene to be rendered will typically comprise many more primitives and draw calls than the four primitives and two draw calls shown in FIG. 3. However, FIG. 3 shows four primitives and two draw calls only for simplicity and clarity purposes.)

In the present embodiment, the graphics object list building unit 28 determines the location of each draw call (graphics descriptor), Draw Call 1 and Draw call 2, and lists the draw calls in a graphics object (descriptor) list for each sub-region (tile) which the draw call falls within. In this way, the system can identify which draw calls (graphics descriptors) should be rendered for each sub-region.

This could be done using, e.g., an exact binning technique, in which case the graphics object list building unit 28 uses the determined transformed vertex positions it is provided with for a given draw call by the programmable vertex shader 27 to identify which sub-regions and sets of sub-regions the draw call falls within (intersects).

As will be appreciated by those skilled in the art, other techniques for determining and locating the draw calls within the scene and in relation to the sub-regions (tiles) 51 could be used if desired. For example, bounding box techniques could equally be used, as is known in the art. FIG. 3 shows exemplary bounding boxes 52, 53 for the draw calls, Draw call 1 and Draw Call 2. (Where a bounding box technique is used, it is preferred for the bounding box to be generated as part of the graphics object (descriptor) listing process, e.g., by the graphics object list building unit, but other arrangements would, of course, be possible.)

This process is repeated by the graphics object list building unit 28 for each and every graphics object (draw call) in the scene to be rendered in turn, until complete graphics object lists 26 (lists of graphics objects (descriptors)) have been generated for each sub-region that the scene to be rendered is divided into.

The graphics object list building unit 28 places the graphics objects (descriptors) in the graphic object lists 26 in the order that it receives the graphics objects from the programmable vertex shader 27. This means that, so far as each individual graphics object list 26 is concerned, the graphics objects (descriptors) in the list are in the order that they were generated, which will, as is known in the art, typically correspond to the desired order of rendering the graphics objects.

As discussed above, the renderer 22 also includes a graphics object list cache 30 and a vertex data cache 32. These caches, as is known in the art, comprise local memory provided on the renderer 22 that can be more rapidly accessed by processing units of the renderer (and in particular the graphics object selection unit 29 and vertex selection unit 31, respectively) than the main memory 23.

The graphics object selection unit 29 is configured to store in the graphic object list cache 30 one or more graphics object lists 26 that it has read from the main memory 23.

The vertex selection unit 31 can similarly cache vertex data that it retrieves from the transformed geometry data 25 in the memory 23 in the vertex data cache 32, again in particular where it can be identified that the vertex data will be required for a primitive again.

Although the above embodiment has been described with reference to using the graphics object (descriptor) lists to indicate primitives to be rendered for the rendering process, these lists could also or instead be used for other purposes, such as to perform (e.g. initial) culling, and/or hidden surface removal, of graphics data and descriptors.

As will be appreciated by those skilled in the art, the example embodiments can be implemented in any tile-based rendering system, as desired. The various components and functions of the example embodiments can similarly be implemented as desired and using any suitable techniques known in the art.

It can be seen from the above that the example embodiment provides a graphics data listing and sorting arrangement for tile-based rendering systems that can for example, facilitate better control over and knowledge of the memory usage and requirements for the tile-listing (primitive sorting (binning)) process and/or provide the opportunity to more readily remove (cull) data from subsequent processing.

This may be of particular value in the case of devices where resource and memory requirements may, e.g., be constrained, such as in embedded devices and/or portable devices, such as mobile phones, etc.

This is achieved in the example embodiments by sorting graphics descriptors (descriptions) that are not simply basic simple primitives into tile lists (on a sub-region-by-sub-region basis).

The invention claimed is:

1. An apparatus for sorting graphics data for processing in a graphics processing system, the apparatus comprising:
    a processor for sorting graphics descriptors that relate to or have associated with them a location or locations in a scene to be rendered into a plurality of lists, each list for a particular area or sub-region of the scene, each graphics descriptor being something other than a primitive of the scene to be rendered,
    wherein the graphics descriptors comprise one or more of graphics descriptors that are non-primitive-based descriptions of objects to be rendered or of graphics processes to be performed.

2. An apparatus for processing graphics data for processing in a graphics processing system, the apparatus comprising:
    a processor for preparing a plurality of lists of graphics descriptors, each list for a respective area or sub-region of a scene to be rendered, each graphics descriptor being something other than a single primitive of the scene to be rendered,
    wherein the graphics descriptors comprise one or more of graphics descriptors that comprise precursor descriptions of objects to be rendered that precede primitive level descriptions of the objects.

3. The apparatus of claim 2, wherein the areas or sub-regions of the scene comprise sub-regions that the scene is divided into for rendering purposes.

4. The apparatus of claim 1, wherein the areas or sub-regions of the scene comprise visible and non-visible areas of the scene.

5. The apparatus of claim 1, wherein the graphics descriptors comprise an indication of graphics processing to be performed in a particular scene location or area.

6. The apparatus of claim 2, wherein the graphics descriptors comprise an indication of graphics processing to be performed in a particular scene location or area.

7. The apparatus of claim 1, wherein the graphics descriptors comprise:
    higher order descriptions of objects to be rendered, higher level descriptions of objects to be rendered or pre-primitive descriptions of objects to be rendered.

8. The apparatus of claim 2, wherein the graphics descriptors comprise:
higher order descriptions of objects to be rendered, higher level descriptions of objects to be rendered or pre-primitive descriptions of objects to be rendered.

9. The apparatus of claim 1, wherein the graphics descriptors comprise draw calls.

10. The apparatus of claim 2, comprising a processor for using the graphics descriptor lists when rendering the scene for display.

11. The apparatus of claim 1, comprising a processor for using the sorted graphics descriptors to perform a culling operation before the scene is rendered.

12. An apparatus for processing graphics data for processing in a graphics processing system, the apparatus comprising:
a processor for dividing a scene to be rendered into a plurality of areas for rendering purposes and for comparing the positions or locations of graphics descriptors of a scene to be rendered with the position or locations of the areas that the scene has been divided into for rendering purposes, each graphics descriptor being something other than a primitive of the scene to be rendered,
wherein the graphics descriptors comprise one or more of graphics descriptors that define a graphics processing procedure that generates a set of primitives at a given location in the scene to be rendered.

13. A method of sorting graphics data for processing in a graphics processing system, the method comprising:
sorting with a processor graphics descriptors that relate to or have associated with them a location or locations in a scene to be rendered into a plurality of lists, each list for a particular area or sub-region of the scene, each graphics descriptor being something other than a primitive of the scene to be rendered,
wherein the graphics descriptors comprise one or more of graphics descriptors that represent objects to be rendered and that are to be converted to primitive-based descriptions of the objects in the future.

14. A method of processing graphics data for processing in a graphics processing system, the method comprising preparing with a processor, for one or more areas or sub-regions of a scene to be rendered, a list of graphics descriptors, each graphics descriptor being something other than a single primitive of the scene to be rendered,
wherein the graphics descriptors comprise draw calls.

15. The method of claim 14, wherein the areas or sub-regions of the scene comprise sub-regions that the scene is divided into for rendering purposes.

16. The method of claim 13, wherein the areas or sub-regions of the scene comprise visible and non-visible areas of the scene.

17. The method of claim 13, wherein the graphics descriptors comprise an indication of graphics processing to be performed in a particular scene location or area.

18. The method of claim 14, wherein the graphics descriptors comprise an indication of graphics processing to be performed in a particular scene location or area.

19. The method of claim 13, wherein the graphics descriptors comprise:
higher order descriptions of objects to be rendered, higher level descriptions of objects to be rendered or pre-primitive descriptions of objects to be rendered.

20. The method of claim 14, wherein the graphics descriptors comprise:
higher order descriptions of objects to be rendered, higher level descriptions of objects to be rendered or pre-primitive descriptions of objects to be rendered.

21. The method of claim 13, wherein the graphics descriptors comprise draw calls.

22. The method of claim 14, comprising using the graphics descriptor lists when rendering the scene for display.

23. The method of claim 13, comprising using the sorted graphics descriptors to perform a culling operation before the scene is rendered.

24. A computer program stored on a non-transitory storage medium comprising computer software code portions for performing the method of claim 13 when the program is run on a data processor.

25. A 3D graphics processor including the apparatus of claim 1.

* * * * *